UNITED STATES PATENT OFFICE.

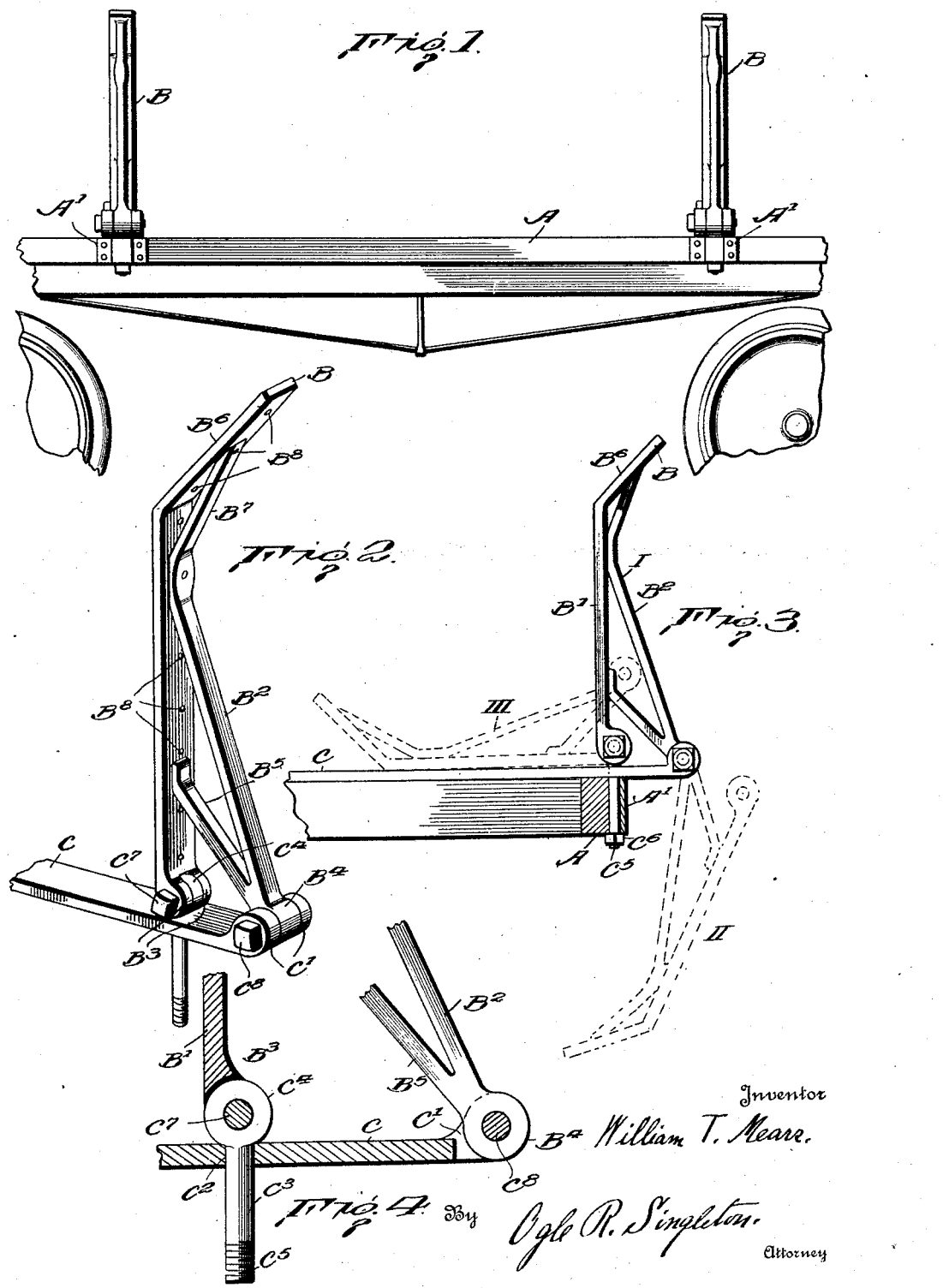

WILLIAM T. MEARS, OF PETERSBURG, VIRGINIA.

VEHICLE STAKE.

1,411,576.  Specification of Letters Patent.  Patented Apr. 4, 1922.

Application filed March 18, 1921. Serial No. 453,203.

*To all whom it may concern:*

Be it known that I, WILLIAM T. MEARS, a citizen of the United States, residing at Petersburg, in the county of Dinwiddie and State of Virginia, have invented certain new and useful Improvements in Vehicle Stakes, of which the following is a specification.

My invention consists in a new and useful improvement in vehicle stakes and is designed to provide a stake adapted for use upon wagons, automobile trucks, freight cars, barges or other freight vehicles, where it is necessary to have removable stakes or sides mounted upon such stakes. My improved stake is removably attached to the vehicle and when so attached is adapted to be swung out of the way and hang below the line of the floor of said vehicle, or to be swung within the vehicle and rest upon the floor. It is of extremely simple but durable construction and as it is comprised of a very small number of parts there is little chance of its being rendered useless through loss or breakage of parts in operation.

The invention is embodied in the details of construction illustrated in the drawings and hereinafter fully described, but I do not consider my invention limited to the specific embodiment herein set forth and refer for its scope to the claims appended hereto.

In the drawings:

Fig. 1 is a side elevation of a portion of a vehicle to which two of my stakes are attached.

Fig. 2 is a general perspective view of my improved stake.

Fig. 3 is a side elevation of one of my stakes, indicating three positions of the stake relative to the vehicle to which it is attached.

Fig. 4 is a vertical section of a portion of my stake.

In the drawings, A indicates a vehicle sill to which my improved stake B is attached. My stake B is composed of the vertical portion $B^1$ and brace $B^2$. The portion $B^1$ is provided with a bifurcated lower extremity forming two hinge knuckles $B^3$. The brace $B^2$ is provided at its lower extremity with a single hinge knuckle $B^4$. An auxiliary brace $B^5$ may be interposed between the brace $B^2$ and the portion $B^1$. An outwardly flaring portion $B^6$ is located at the upper extremity of the portion $B^1$ and a brace $B^7$ is placed between the portion $B^1$ and the portion $B^6$. Holes $B^8$ may be placed in the portions $B^1$ and $B^6$ to permit side bars to be attached to the stakes B, to connect same to form a side wall for the vehicle. My improved stake B is mounted upon a base plate C which is fixed by any suitable means to the floor of the vehicle. This plate C may be bolted to the sill A or may be made in the form of a strap crossing the floor of the vehicle, as may be desired. The plate C is provided with a bifurcated end forming two hinge knuckles $C^1$, and is also provided with an opening $C^2$ adapted to receive therethrough a removable pin $C^3$ which has formed upon its head a single hinge knuckle $C^4$. This pin $C^3$ passes between the side of the sill A and cross-straps $A^1$ fastened thereto (Fig. 3), and has a lower threaded portion $C^5$ upon which a nut $C^6$ may be screwed to hold the pin C in proper position. The knuckles $C^1$ receive therebetween the knuckle $B^4$ being pinned by the pintle bolt $C^8$, and the knuckle $C^4$ is received between the knuckles $B^3$ being pinned by the pintle bolt $C^7$, thus forming two hinged connections, between the plate C, the portion $B^1$, and the brace $B^2$ respectively.

In Fig. 3, the numeral I indicates the normal position of the stake B when in place upon the vehicle both of the pintle bolts $C^7$ and $C^8$ being in position in their respective hinges. By removing the pintle bolt $C^7$, it is possible to swing the stake B upon the pintle bolt $C^8$ until it assumed the position II indicated in dotted lines in Fig. 3. By removing the pintle bolt $C^8$, it is possible to swing the stake B upon the pintle bolt $C^7$ until it assumes the position III indicated in dotted lines in Fig. 3. Thus it is obvious that my improved stake B may be swung outboard relative to the vehicle and hang below the line of the floor to permit loading of the vehicle, and also my stake B may be swung inboard and lie upon the floor of the vehicle when it is desired to carry the stakes in such position. By removing both pintle bolts $C^7$ and $C^8$, it is possible to detach my stake B from the plate C and remove the stake from the vehicle. When this is done, the nut $C^6$ may be removed from the pin C³ and said pin withdrawn from the plate C, leaving only plate C upon the vehicle.

Having described my invention, what I claim is:

1. In a vehicle stake, the combination of a vertical portion provided with a hinge element; an inclined brace portion provided with a hinge element; a base plate provided with a hinge element; and a removable pin adapted to be applied to said plate and provided with a hinge element, said latter elements being adapted to co-act respectively with the hinge elements upon the said portions.

2. In a vehicle stake, the combination of a base plate provided with a hingle element and an orifice; a pin adapted to be applied to said orifice and provided with a hinge element; a vertical portion provided with a hinge element adapted to co-act with the hinge element of said pin; and an inclined brace portion provided with a hinge element adapted to co-act with the hinge element of said plate.

3. In a vehicle stake, the combination of a base plate provided with hinge knuckles and an orifice; a removable pin adapted to be mounted on said plate through said orifice and provided with a hinge knuckle; a vertical portion provided with hinge knuckles adapted to co-act with said pin hinge knuckle; a removable pintle adapted to fasten said vertical portion to said pin; an inclined brace portion provided with a hinge knuckle adapted to co-act with said plate hinge knuckles; and a removable pintle adapted to fasten said brace portion to said plate.

In testimony whereof I affix my signature.

WILLIAM T. MEARS.